United States Patent
Ripley

(10) Patent No.: US 11,511,716 B2
(45) Date of Patent: Nov. 29, 2022

(54) EBS TRACTOR CONTROL LINE TO TRAILER SYSTEM TO IMPROVE TRANSMISSION TIMING FOR AN AIR BRAKE SYSTEM

(71) Applicant: Bendix Commercial Vehicle Systems LLC, Elyria, OH (US)

(72) Inventor: John V. Ripley, Elyria, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 122 days.

(21) Appl. No.: 16/438,637

(22) Filed: Jun. 12, 2019

(65) Prior Publication Data

US 2020/0391714 A1 Dec. 17, 2020

(51) Int. Cl.
*B60T 13/26* (2006.01)

(52) U.S. Cl.
CPC ....... *B60T 13/263* (2013.01); *B60T 2270/414* (2013.01)

(58) Field of Classification Search
CPC ...... B60T 13/26; B60T 13/261; B60T 13/263; B60T 13/268; B60T 13/403
See application file for complete search history.

(56) References Cited

U.S. PATENT DOCUMENTS

| | | |
|---|---|---|
| 2,700,435 A | 1/1955 | Seale |
| 3,256,045 A | 6/1966 | Stelzer |
| 3,507,542 A | 4/1970 | Cannella |
| 4,054,327 A | 10/1977 | Rebenstorf |
| 4,076,325 A | 2/1978 | Bray |
| 4,368,926 A | 1/1983 | Bartholomew |
| 4,629,256 A * | 12/1986 | Fannin .................. B60T 13/263 303/8 |
| 5,226,692 A * | 7/1993 | Eberling ............... B60T 15/041 303/14 |
| 5,294,190 A | 3/1994 | Feldmann et al. |
| 5,445,440 A | 8/1995 | Plantan |
| 5,549,362 A | 8/1996 | Brome |
| 6,062,652 A * | 5/2000 | Eberling ............... B60T 13/263 303/64 |
| 6,851,762 B2 | 2/2005 | Kamiya et al. |
| 8,512,208 B2 | 8/2013 | Hilberer |

(Continued)

FOREIGN PATENT DOCUMENTS

| | | |
|---|---|---|
| DE | 197 52 147 B4 | 8/2013 |
| EP | 2 059 429 B1 | 5/2009 |

(Continued)

*Primary Examiner* — Thomas J Williams
(74) *Attorney, Agent, or Firm* — Fay Sharpe LLP

(57) ABSTRACT

A brake control signal amplification system that is designed to assist with the compliance to the FMVSS-121 Safety Standard for an air braked vehicle is described which comprises a trailer control module (TCM) that provides pneumatic signal to a trailer of the vehicle, a tractor protection valve (TPV) that protects a tractor air brake system in the event of a pneumatic disconnection from the trailer, and a pilot relay valve (PRV) coupled between the TCM and the TPV, wherein the PRV amplifies a control signal received from the TCM and delivers an amplified control signal to the to the TPV. The TPV delivers the amplified control signal to a control coupling for a trailer portion of a vehicle and delivers an air supply to a supply coupling for the trailer of the vehicle.

13 Claims, 3 Drawing Sheets

(56) References Cited

U.S. PATENT DOCUMENTS

| | | |
|---|---|---|
| 9,327,694 B2 | 5/2016 | Klostermann et al. |
| 2018/0273013 A1 | 9/2018 | Niglas et al. |

FOREIGN PATENT DOCUMENTS

| | | |
|---|---|---|
| EP | 2 165 901 B1 | 9/2011 |
| EP | 3 092 158 A1 | 11/2016 |
| EP | 3 286 051 A1 | 2/2018 |
| GB | 1 457 434 A | 12/1976 |
| JP | 2007-137213 A | 6/2007 |

\* cited by examiner

EBS TRACTOR CONTROL LINE TO TRAILER SYSTEM TO IMPROVE TRANSMISSION TIMING FOR AN AIR BRAKE SYSTEM

BACKGROUND

The present application finds a particular application in vehicular air braking systems.

However, it will be appreciated that the described techniques may also find application in other pneumatic systems, or other vehicular devices.

Some vehicles plumbed with certain European electronic braking systems have difficulty complying with the transmission timing requirements of the American Federal Motor Vehicle Safety Standard FMVSS-121. This standard applies to trucks, buses and trailers equipped with air brake systems, and establishes performance and equipment requirements for braking systems on vehicles equipped with air brake systems, including separately controlled parking brakes of prescribed holding capability, automatic brake adjusters and adjustment indicators, and emergency brakes which activate automatically in the event of loss of air pressure.

The compliance problem occurs because the main control signal of an electronic braking system (EBS) system is electrical, and these systems only use pure pneumatic braking when the electricity is no longer available. FMVSS-121 currently requires that a tractor must meet the timing requirements with and without the anti-lock braking system (ABS) system powered. As ABS is a function within EBS that cannot be separated, the current state of the regulations requires that the vehicle must still meet all requirements even when in "pneumatic back-up" mode.

The present innovation provides new and improved systems and methods that facilitate improving application and release timing for a vehicular air brake system to ensure compliance with the FMVSS 121 standard, which overcome the above-referenced problems and others.

SUMMARY

In accordance with one aspect, a brake control signal amplification system for a vehicle comprises a trailer control module (TCM) that provides pneumatic signal to a trailer of the vehicle, a tractor protection valve (TPV) that protects a tractor air brake system in the event of a pneumatic disconnection from the trailer, and a pilot relay valve (PRV) coupled between the TCM and the TPV, wherein the PRV amplifies a control signal received from the TCM and delivers an amplified control signal to the TPV. The TPV delivers the amplified control signal to a control coupling for a trailer portion of a vehicle and delivers an air supply to a supply coupling for the trailer of the vehicle.

In accordance with another aspect, an apparatus for amplifying a brake control signal in a vehicle comprises means for providing pneumatic signal to a trailer of the vehicle, means for protecting a tractor air brake system in the event of a pneumatic disconnection from the trailer, and means for amplifying a control signal, the means for amplifying being coupled between the means for providing the pneumatic signal and the means for protecting. The control signal is received from the means for providing the pneumatic signal, and the means for amplifying delivers an amplified control signal to the to the means for protecting. The means for protecting is further configured to deliver the amplified control signal to a control coupling for a trailer portion of a vehicle and to deliver an air supply to a supply coupling for the trailer of the vehicle. In accordance with another aspect, a valve arrangement for amplifying a brake control signal in a vehicle comprises a trailer control module (TCM) that provides pneumatic signal to a trailer of the vehicle, and a select high valve coupled to the TCM, wherein the select high valve receives an air signal from each of a primary delivery port and a secondary delivery port of a foot brake module, and delivers the higher of the two air signals to a control port of the TCM. The valve configuration further comprises a tractor protection valve (TPV) that protects a tractor air brake system in the event of a pneumatic disconnection from the trailer, and a pilot relay valve (PRV) coupled between the TCM and the TPV, wherein the PRV amplifies a control signal received from the TCM and delivers an amplified control signal to the to the TPV. The TPV delivers the amplified control signal to a control coupling for a trailer portion of a vehicle and delivers an air supply to a supply coupling for the trailer of the vehicle.

One advantage is that system application and release timing is improved.

Another advantage is that compliance with the FMVSS 121 standard is achieved.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The described innovation relates to amplifying control signals from a foot brake valve to assist in meeting FMVSS-121 trailer timing requirements. Within an EBS system, there is a trailer control module (TCM) which is comprised of a relay valve, three solenoids and a sensor in one housing. This valve is important for the EBS system to function correctly in its normal operating electronic mode. However, the relay valve portion in a European style valve is not designed to meet the FMVSS-121 requirements. The described innovation thus further amplifies an already-amplified control signal, thus turning the TCM from a delivery device to a control device while providing enough air flow to satisfy the regulations. In this manner, application timing of a 50 in$^3$ volume can be reduced to below 0.35 seconds, and release timing of a 50 in$^3$ volume can be reduced to below 0.75 seconds, as required by FMVSS-121.

Figure 1:
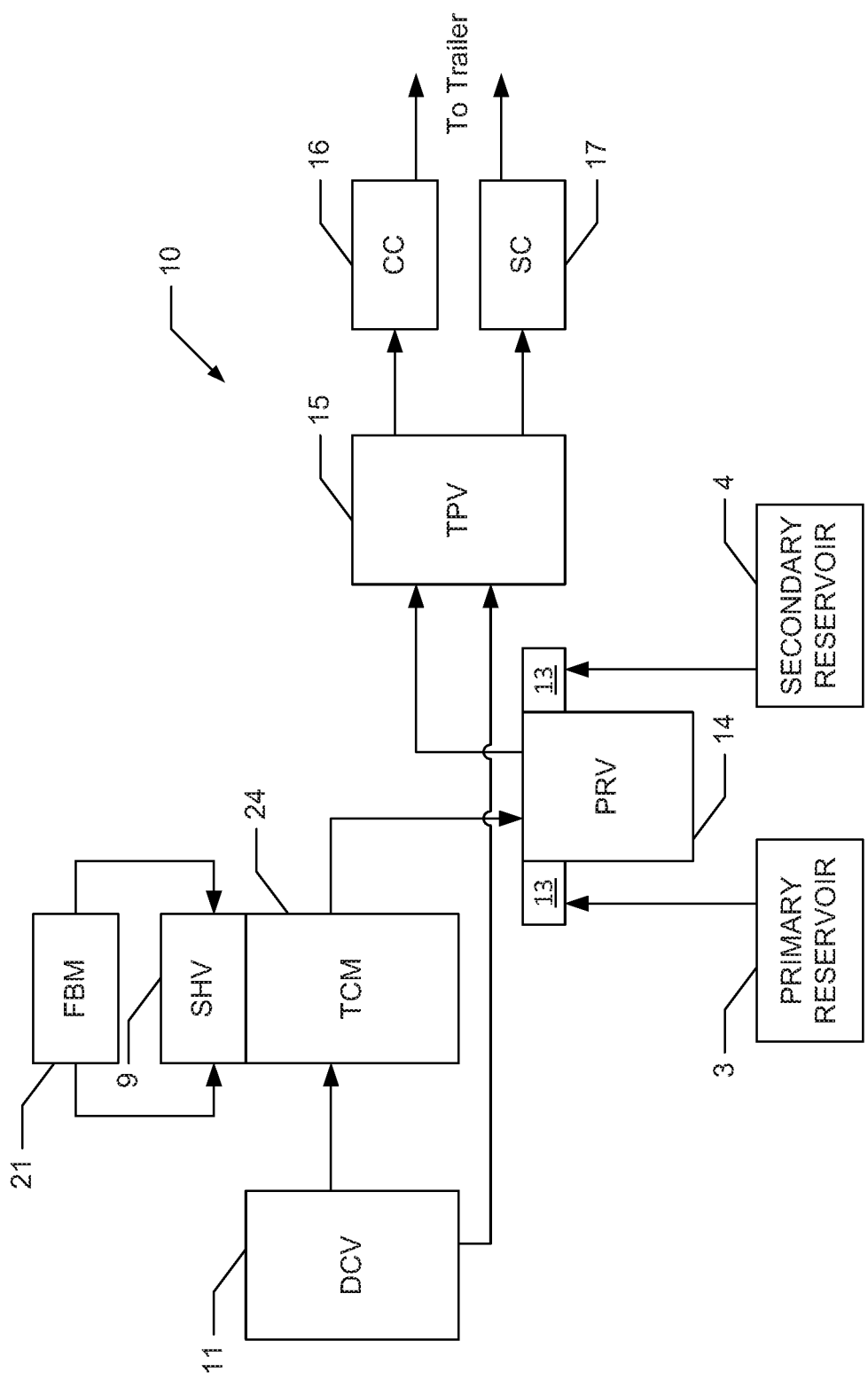
FIG. 1 shows a brake control signal amplification system that facilitates amplifying control signals from a foot brake valve to assist in meeting FMVSS-121 transmission timing requirements, in accordance with one or more features described herein.

FIG. 1 shows a brake control signal amplification system 10 that facilitates amplifying control signals from a foot brake valve to assist in improving transmission timing, including meeting FMVSS-121 transmission timing requirements, in accordance with one or more features described herein. The system 10 comprises a primary supply reservoir 3, and a secondary supply reservoir 4, for supplying air to various components of the system 10. The system also includes a select high check valve (SVH) 9, also referred to herein as a double check valve. The select high check valve 9 may be, e.g., a Bendix DC-4® double check valve or the like. A dash control valve 11 (e.g., a Bendix MV-3® dash control valve or some other suitable dash control valve) is illustrated, as is a single check valve 13 (e.g., a Bendix SC-3 single check valve or the like).

In order to overcome the aforementioned problems, a pilot relay valve 14 (also referred to herein as a booster valve) is provided in the circuit of the system 10. In one embodiment, the pilot relay valve 14 is a Bendix R-12PTM valve. This valve facilitates increasing air pressure, which in turn transmits air back to the trailer portion of the vehicle more quickly, thus improving brake availability and meeting the FMVSS-121 standard requirements.

The Bendix® R-12P™ pilot relay valve (PRV) is designed to speed up control signal application and release on long non-towing trailers, towing trailers, dollies, and long wheelbase tractors. It does this without adversely affecting the control signal. Unlike a standard relay valve used as a "booster," which typically has a 2 to 4 psi differential between control and delivery, the R-12P™ valve has zero differential. The pilot relay valve speeds up control line signal application and release in a train of vehicles, and it delivers the same air pressure that it receives. This provides a uniform brake signal to all trailer and dolly brakes, even during light applications. The unique R-12P™ valve feature is that it uses a supply air pressure load to quicken the valve's response time. By balancing the pressure signal to all trailer and dolly brakes, the R-12P™ valve aids in achieving overall vehicle brake pressure balance, timing balance, and stability. Normally, the R-12P™ receives a low flow control signal, however in this application, the R-12P™ is receiving a control signal from another relay valve, which is a high flow signal.

The pilot relay valve 14 is coupled to a tractor protection valve (TPV) 15, such as a Bendix TP-3DC™ valve or a Bendix TP-5™ valve or the like. The tractor protection valve system protects tractor air brakes during trailer breakaway and/or when severe air leakage develops in the tractor or trailer. This function is required by law. In normal use the tractor protection valve is used to shut off the trailer control line before disconnecting the tractor from the trailer. It is usually mounted at the rear of the tractor cab, and it is used in conjunction with a dash-mounted control valve.

The TP-3DC™ valve integrates tractor protection and double check valve functions. It also has an integral single check valve that prevents trapping of air in the trailer control line. This prevents service and spring brake compounding, and it avoids a trailer roll away situation if the trailer is parked with the air applied.

Also shown are a control coupling 16 and a supply coupling 17. A foot brake module (FBM) 21 is illustrated via which a driver actuates the vehicle brake system. A trailer control module (TCM) 24 is shown, which provides signal to the trailer portion of the vehicle.

Figure 2:
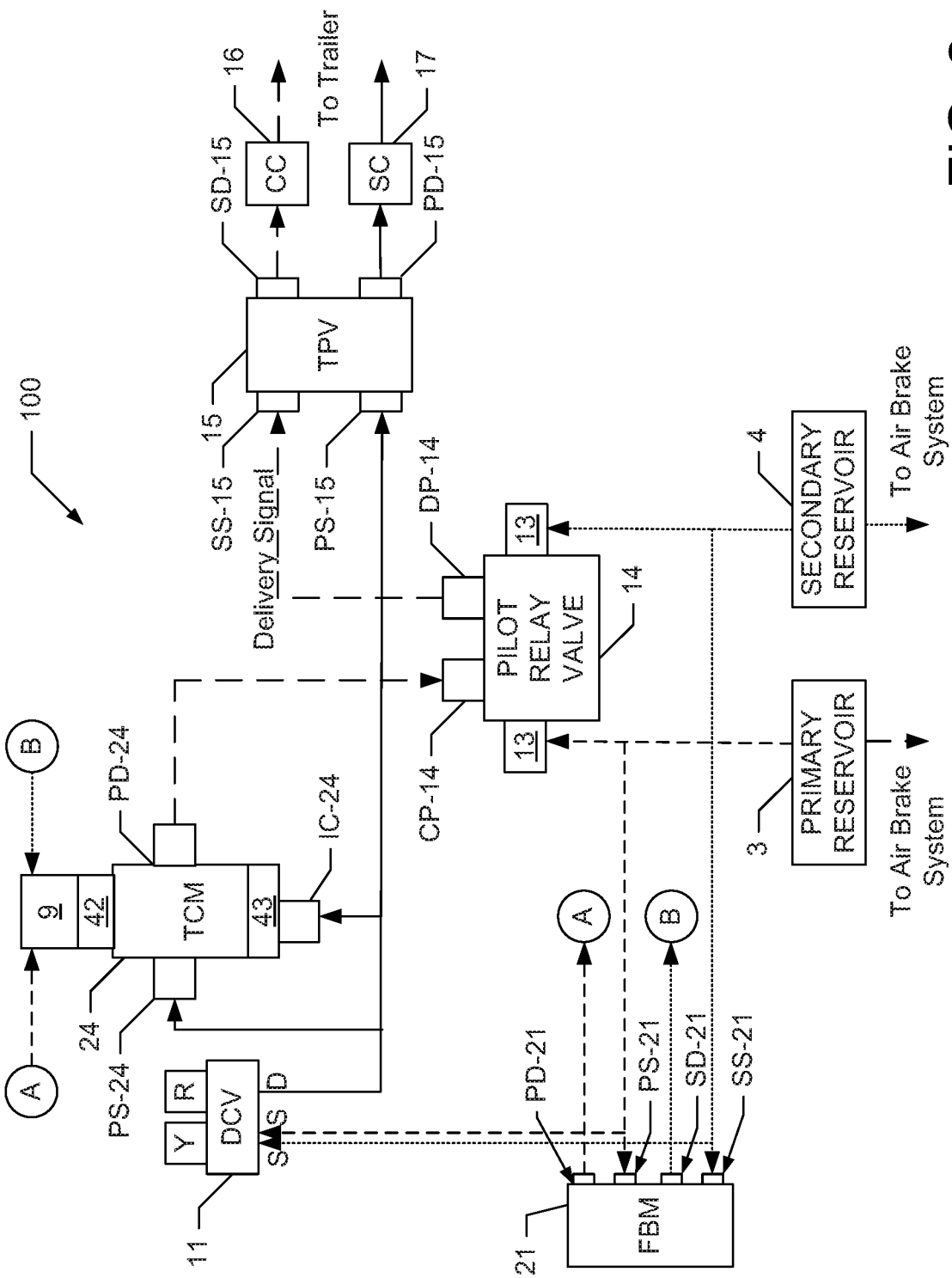
FIG. 2 illustrates a valve arrangement for supplying air to a trailer for braking in a tractor-trailer vehicle while complying with the FMVSS 121 standard, in accordance with one or more features described herein.

With continued reference to FIG. 1, FIG. 2 illustrates a more detailed view of a valve arrangement 100 such as may be employed in the system of FIG. 1, in accordance with various aspects described herein. Air flow in FIG. 2 is illustrated by different line configurations. For instance, air originating from the primary reservoir 3 is shown with a short-dashed line, while air originating from the secondary reservoir 4 is shown with a dashed line. Air originating from the dash control valve 11 is shown with a solid line, while air originating from the tractor control module is shown with a long-dashed line.

With regard to port designations for the various valves illustrated in FIG. 2, a primary supply port PS-24, a control port 42, and, an inverting control port 43, along with a primary delivery port PD-24 are shown for TCM 24. The TPV 15 includes primary and secondary supply ports PS-15 and SS-15, along with primary and secondary delivery ports PD-15 and SD-15. Two delivery and two supply ports are shown for the FBM 21, including a primary supply PS-21 and secondary supply SS-21 along with primary delivery PD-21 and secondary delivery SD-21. For the remaining valves illustrated in FIG. 2, unless otherwise indicated by a particular reference numeral, delivery ports are labeled with a "D", supply ports with an "S", and control ports with a Supply reservoirs 3, 4 contain the compressed air used in the brake system. They supply air to the supply ports S of the dash control valve 11 the pilot relay valve 14 via the single check valves 13 and the FBM 21. When the red button R on the Dash Control Valve (DCV) 11 is pushed in, it delivers air to the supply port PS-24 and inverting control port IC-24 of the TCM 24, and the supply port PS-15 of the tractor protection valve 15, which in turn delivers air to the supply coupling 17. This represents the state the vehicles trailer circuit when in motion.

When the FBM 21 is activated (i.e., depressed by foot), air is sent out both delivery ports to the supply ports (not shown) of the select high valve 9, which in turn delivers the highest of the two signals to the control port 42 of the TCM (24). The TCM 24 then delivers air to the control port CP-14 of the pilot relay valve 14, which will then deliver air to the service port SS-15 of the tractor protection valve 15, which then delivers air to the control coupling 16.

The TCM may comprise a pneumatic relay valve with two control chambers for service brake, one control chamber for parking brake, three solenoid valves (inlet solenoid valve EV, outlet solenoid valve AV, back-up solenoid valve BV) and a pressure sensor. The TCM may also comprise one electrical port and five pneumatic ports. The electrical connection includes energy supply and the electrical control lines for the solenoid valves (controlled by the EBS control unit) as well as the signal lines from the pressure sensor. On the inlet side the pneumatic connections are a supply line and two control lines (from the foot brake module to 42, and from a parking brake valve to 43. On the outlet side the pneumatic connections comprise the dual-line braking system to the trailer vehicle (a supply line and control line). The exhaust is expelled via a silencer.

The service brake line from the FBM to the TCM is connected to that circuit of the FBM, which is directly driven by the mechanical actuator, normally the primary circuit. It has to be ensured, that there is no pressure offset in the service brake line. The main function of the TCM is to control the service brake pressure at the trailer control line. The parking brake is actuated purely pneumatically and the automatic braking function (supply dump function) is performed by pneumatics and supported by software.

A central ECU powers the solenoid valves of the TCM via electrical lines. During electronic braking the backup valve (BV) is closed (energized). The ECU controls inlet solenoid (EV) and outlet solenoid (AV) according to the signal of the pressure sensor and generates a pneumatic signal in the control chamber. This is passed on to the trailer control line coupling head via the relay part of the TCM.

The pneumatic input (service brake line) at the upper control chamber is locked from the control chamber by a backup solenoid valve (BV), which is closed for electrical braking. When switched over to back-up operation the BV is deenergized and opens the passage to the upper control chamber and passes on the service brake circuit to the control line coupling head. The pressure at the upper control chamber of the TCM acts on a separate control piston. Precise data of the characteristic lines can be taken from the TCM offer drawing. The parking brake circuit is being supplied during the parking brake is released, so that the trailer service brake cylinders are not braked. Activation of the parking brake puts pressure into the trailer control line and thus brakes the trailer. If the trailer control line gets lost or broken, the supply of the supply line is strongly reduced.

With continued reference to FIG. 2, the valve arrangement 100 comprises the pilot relay valve (PRV) 14 interposed between the tractor protection valve (TPV) 15 and the trailer control module (TCM) 24. The TPV 15 may be a Bendix TP-3DCTM valve or a Bendix TP-5TM valve or the like. The addition of the PRV 14 causes air signal to be amplified and/or accelerated to improve transmission timing of the air brake system. The select high valve 9 is coupled to the TCM 24 and receives air from the primary and secondary delivery ports of the foot brake module 21 (FIG. 1). The select high valve 9 then delivers the highest of the two signals to the control port of the TCM (24). Air from the dash control valve 11 (FIG. 1) is received at the TCM via primary supply port PS-24 and the inverted control port IC-24. A primary delivery port PD-24 of the TCM delivers air to a control port CP-14 of the PRV 14.

A pair of single check valves 13 positioned on the PRV receive, respectively, air from the primary and secondary reservoirs 3, 4, (FIG. 1). The PRV delivers, via a delivery port DP-14, a delivery signal to a secondary supply port SS-15 on the TPV 15. The TPV also receives air from the dash control valve 11 via a primary supply port PS-15. The TPV provides air to a control coupling 16 via a secondary delivery port SD-15, and the control coupling then provides a control signal to the trailer of the vehicle. The TPV also provides air to a supply coupling 17 via a primary delivery port PD-15, and the supply coupling then supplies air to the trailer for braking.

Figure 3:
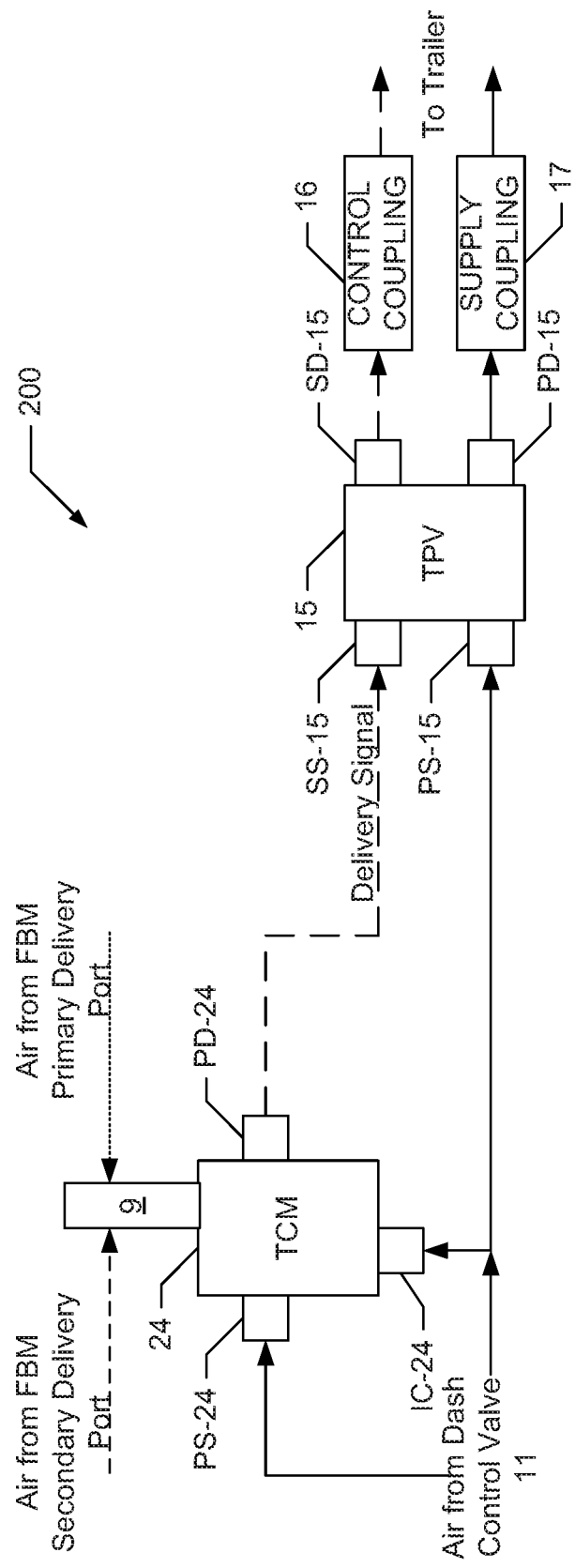
FIG. 3 illustrates another example of a valve arrangement for supplying air to a trailer for braking in a tractor-trailer vehicle.

FIG. 3 illustrates another example of a valve arrangement 200 for supplying air to a trailer for braking in a tractor-trailer vehicle. The arrangement of FIG. 3 includes all the components of the arrangement 100 (FIG. 2) with the exception of the PRV 14. While the valve arrangement 200 is functional and meets requirements in many countries, it may not meet the requirements of FMVSS 121 due to the lack of the PRV 14, thus giving rise to the problem solved by the system(s) of FIGS. 1 and 2.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An apparatus for amplifying a brake control signal in a vehicle, comprising:
    means for providing pneumatic signal to a trailer of the vehicle;
    means for protecting a tractor air brake system in the event of a pneumatic disconnection from the trailer; and
    means for amplifying a control signal, the means for amplifying being coupled between the means for providing the pneumatic signal and the means for protecting, wherein the control signal is received from the means for providing the pneumatic signal, and wherein the means for amplifying delivers an amplified control signal to the to the means for protecting; and
    wherein the means for protecting delivers the amplified control signal to a control coupling for a trailer portion of a vehicle and delivers an air supply to a supply coupling for the trailer of the vehicle; and
    further comprising means for delivering air to a port on the means for protecting the tractor air brake system and to at least two ports on the means for amplifying the control signal.

2. The apparatus according to claim 1, further comprising a select high valve coupled to the means for providing pneumatic signal, wherein the select high valve receives an air signal from each of a primary delivery port and a secondary delivery port of a foot brake module.

3. The apparatus according to claim 2, wherein the select high valve delivers the higher of the two air signals to a control port of the means for providing pneumatic signal.

4. The apparatus according to claim 3, wherein the means for providing pneumatic signal further receives air from a dash control valve via primary supply port and delivers air to a control port of the means for amplifying.

5. The apparatus according to claim 4 wherein the means for amplifying comprises two single check valves that receive air from each of a primary reservoir and a second reservoir, respectively, and wherein the means for amplifying delivers, via a delivery port, a delivery signal to a secondary supply port on the means for protecting.

6. The apparatus according to claim 5, wherein the means for protecting receives air from the dash control valve via a primary supply port, provides air to the control coupling via a secondary delivery port, and provides air to the supply coupling via a primary delivery port.

7. The apparatus according to claim 6, wherein the control coupling provides a control signal to the trailer of the vehicle, and the supply coupling then supplies air to the trailer for braking.

8. A valve arrangement for amplifying a brake control signal in a vehicle, comprising:
    a trailer control module (TCM) configured to provide pneumatic signal to a trailer of the vehicle;
    a select high valve coupled to the TCM, wherein the select high valve receives an air signal from each of a primary delivery port and a secondary delivery port of a foot brake module, and delivers the higher of the two air signals to a control port of the TCM;
    a tractor protection valve (TPV) configured to protect a tractor air brake system in the event of a pneumatic disconnection from the trailer; and
    a pilot relay valve (PRV) coupled between the TCM and the TPV, wherein the PRV is configured to amplify a control signal received from the TCM and delivers an amplified control signal to the to the TPV; and
    wherein the TPV delivers the amplified control signal to a control coupling for a trailer portion of a vehicle and delivers an air supply to a supply coupling for the trailer of the vehicle; and further comprising a dash control valve (DCV) that delivers air to three ports in the valve arrangement.

9. The valve arrangement according to claim 8, wherein:
the TCM further receives air from the dash control valve via primary supply port and an inverting control port, and delivers air to a control port of the PRV;
the PRV comprises two single check valves that receive air from each of a primary reservoir and a second reservoir, respectively, and wherein the PRV delivers, via a delivery port, a delivery signal to a secondary supply port on the TPV;
the TPV receives air from the dash control valve via a primary supply port, provides air to the control coupling via a primary delivery port, and provides air to the supply coupling via a secondary delivery port; and
the control coupling provides a control signal to the trailer of the vehicle, and the supply coupling then supplies air to the trailer for braking.

10. The valve arrangement according to claim 8, wherein:
the TCM further receives air from a dash control valve via primary supply port and delivers air to a control port of the PRV.

11. The valve arrangement according to claim 8, wherein:
the PRV comprises two single check valves that receive air from each of a primary reservoir and a second reservoir, respectively, and wherein the PRV delivers, via a delivery port, a delivery signal to a secondary supply port on the TPV.

12. The valve arrangement according to claim 8, wherein:
the TPV receives air from a dash control valve via a primary supply port, provides air to the control coupling via a secondary delivery port, and provides air to the supply coupling via a primary delivery port.

13. The valve arrangement according to claim 8, wherein:
the control coupling provides a control signal to the trailer of the vehicle, and the supply coupling then supplies air to the trailer for braking.

\* \* \* \* \*